(12) United States Patent
Ono et al.

(10) Patent No.: US 7,995,450 B2
(45) Date of Patent: Aug. 9, 2011

(54) OPTICAL ELEMENT FEEDING DEVICE AND OPTICAL PICKUP UNIT USING THE SAME

(75) Inventors: Seiji Ono, Yokosuka (JP); Naomitsu Kuroda, Yokohama (JP); Eiji Okubo, Yokohama (JP); Yasushi Kinoshita, Hitachinaka (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 495 days.

(21) Appl. No.: 11/686,382

(22) Filed: Mar. 15, 2007

(65) Prior Publication Data
US 2007/0226759 A1   Sep. 27, 2007

(30) Foreign Application Priority Data

Mar. 27, 2006   (JP) .................................. 2006-084465

(51) Int. Cl.
*G11B 23/00*   (2006.01)
(52) U.S. Cl. ............... 369/263.1; 369/44.14; 369/44.15; 369/44.17; 369/44.21; 369/44.29; 369/44.32; 369/44.24; 369/53.25
(58) Field of Classification Search .................... None
See application file for complete search history.

(56) References Cited

U.S. PATENT DOCUMENTS

| | | | |
|---|---|---|---|
| 4,631,716 A * | 12/1986 | Ikedo et al. ................... 720/610 |
| 6,654,321 B2 * | 11/2003 | Okada et al. ............... 369/44.28 |
| 7,106,668 B2 * | 9/2006 | Okada et al. ................ 369/30.27 |
| 7,126,763 B2 * | 10/2006 | Sasaki ............................ 359/696 |
| 7,173,772 B2 * | 2/2007 | Masuda ......................... 359/696 |
| 2001/0005356 A1 * | 6/2001 | Park ............................... 369/255 |
| 2001/0019520 A1 * | 9/2001 | Uemura et al. ............. 369/44.23 |
| 2003/0117726 A1 * | 6/2003 | Yamazaki ..................... 359/824 |
| 2004/0208093 A1 * | 10/2004 | Omori et al. .............. 369/44.32 |
| 2005/0200975 A1 * | 9/2005 | Makii et al. ................... 359/696 |
| 2006/0143637 A1 * | 6/2006 | Torii ............................. 720/660 |
| 2006/0162876 A1 * | 7/2006 | Kwak ............................ 160/296 |
| 2007/0019100 A1 * | 1/2007 | Mitani et al. ................. 348/335 |
| 2007/0206460 A1 * | 9/2007 | Ono et al. .................. 369/44.32 |
| 2009/0059745 A1 * | 3/2009 | Kikuchi ..................... 369/44.32 |

FOREIGN PATENT DOCUMENTS

JP   07-140368   6/1995
JP   08-075974   3/1996

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

In an optical element feeding device and an optical pickup unit using the same, in order to make the device compact and light and achieve a stable operation, the device has a main shaft and a sub shaft supporting a movable frame in which an optical element is arranged in such a manner as to be movable in a direction of an optical axis, a stepping motor, a lead screw rotating on the basis of a rotation of the stepping motor, a resin nut engaging with the lead screw and being movable in the direction of the optical axis on the basis of the rotation of the lead screw, and a spring pressing the movable frame in the direction of the optical axis so as to bring the movable frame into contact with the nut, and a cushioning material is provided between the nut and the movable frame so as to connect the nut and the movable frame.

18 Claims, 6 Drawing Sheets

OPTICAL ELEMENT FEEDING DEVICE AND OPTICAL PICKUP UNIT USING THE SAME

CLAIM OF PRIORITY

The present application claims priority from Japanese application JP2006-084465 filed on Mar. 27, 2006, the content of which is hereby incorporated by reference into this application.

FIELD OF THE INVENTION

The present invention relates to a lens (an optical element) feeding device used for correcting an aberration or the like, and an optical pickup unit using the same.

DESCRIPTION OF RELATED ART

An optical disc recording and reproducing device corresponds to an optical information recording and reproducing device characterized by a non-contact, a large capacity, a high-speed access, a low cost and the like, and is used as a digital audio signal recording and reproducing device, an external memory device of a computer or the like in various fields by effectively utilizing these characteristics. Further, it is essential to improve various performances and reliability of an optical pickup unit mounted to the optical disc recording and reproducing device in correspondence to an enlargement of a field of application.

The optical disc recording and reproducing apparatus is provided with an optical element feeding device moving the lens in a direction of an optical axis for correcting the aberration. The optical element feeding device is disclosed, for example, JP-A-8-75974 and JP-A-7-140368.

BRIEF SUMMARY OF THE INVENTION

In order to improve a recording density of the optical disc recording and reproducing device, it is effective to enlarge a numerical aperture of an objective lens as well as to make a wavelength of a light source short, and in standards of a high-density optical disc using a blue-violet laser having a laser wavelength close to 400 nm, there is included a BD (Blu-ray-Disc) standard using a high NA objective lens in which the numerical aperture (NA) is 0.85 and an optical disc in which a thickness of a recording layer protection film is 0.1 mm.

In the Blu-ray-Disc, since a first recording layer and a second recording layer are arranged within one optical disc so as to be spaced at a predetermined interval in a thickness direction of the disc, a spherical aberration is generated at a time of changing from one recording layer to the other recording layer. In order to correct the spherical aberration, a movable lens is provided in front of the objective lens of the optical pickup unit, and the spherical aberration is corrected by fine adjusting the position of the movable lens by the optical element feeding device.

The optical element feeding device is structured such that the movable lens is attached to a movable frame, a stepping motor is used as a power source of the movable frame, and the movable frame (the movable lens) is moved in the direction of the optical axis by rotationally driving the stepping motor.

The optical element feeding device is used in a state in which a metal is used for a material of a nut, and a grease is applied to the other rotation preventing contact portions than a thread portion provided in the nut.

In the stepping motor used in the optical element feeding device, since a load is differentiated by a low circumferential temperature, or a dispersion of the grease application amount, there is a problem that a minimum driving voltage becomes higher, and a margin such as a step out or the like runs short. Accordingly, it is necessary to use a great stepping motor. Therefore, a shape of the stepping motor is enlarged, and an electric power consumption thereof is large.

An object of the present invention is to provide an optical element feeding device which solves the problem mentioned above, and has a high reliability, a compact size and a small electric power consumption, and an optical pickup unit using the same.

In order to achieve the object mentioned above, in accordance with a first aspect of the present invention, there is provided an optical element feeding device for moving an optical element in a direction of its optical axis, comprising:

a support means for supporting a movable member in which the optical element is arranged in such a manner as to be movable in the direction of the optical axis;

a stepping motor;

a screw arranged in parallel to the direction of the optical axis and rotating on the basis of a rotation of a rotating shaft of the stepping motor;

a resin nut engaging with the screw, the resin nut being provided with a rotation preventing portion and being movable in the direction of the optical axis on the basis of the rotation of the screw; and a pressing member pressing the movable member in the direction of the optical axis so as to bring the movable member into contact with the nut, wherein the nut is coupled to the movable member via a cushioning material.

In the optical element feeding device in accordance with the first aspect of the present invention, it is preferable that the screw is directly connected onto the rotating shaft of the stepping motor. Further, it is preferable that the cushioning material couples a part of the nut and a part of the movable member, and it is preferable that a concave portion or a convex portion for storing the cushioning material is formed in at least one of the movable member and the nut. Further, it is preferable that a metal is formed around the resin nut except the rotation preventing portion.

In order to achieve the object mentioned above, in accordance with a second aspect of the present invention, there is provided an optical element feeding device, wherein a part of the nut is formed by a metal, in place of the structure in which the nut is coupled to the movable member via the cushioning material.

In order to achieve the object mentioned above, in accordance with a third aspect of the present invention, there is provided an optical pickup unit comprising:

the optical element feeding device as described in the first or second aspect of the present invention;

a laser light source;

a collimator lens changing a laser beam radiated from the laser light source to a parallel light;

a collecting lens for collecting the laser beam on an optical disc; and a light detector detecting a return light from the optical disc.

In accordance with the present invention, it is possible to provide the optical element feeding device having a high reliability and the optical pickup using the same.

Other objects, features and advantages of the invention will become apparent from the following description of the embodiments of the invention taken in conjunction with the accompanying drawings.

BRIEF DESCRIPTION OF THE SEVERAL VIEWS OF DRAWING

DETAILED DESCRIPTION OF THE INVENTION

A description will be given in detail of an embodiment of an optical element feeding device in accordance with the present invention and an optical pickup unit using the same, with reference to the accompanying drawings.

Figure 3:
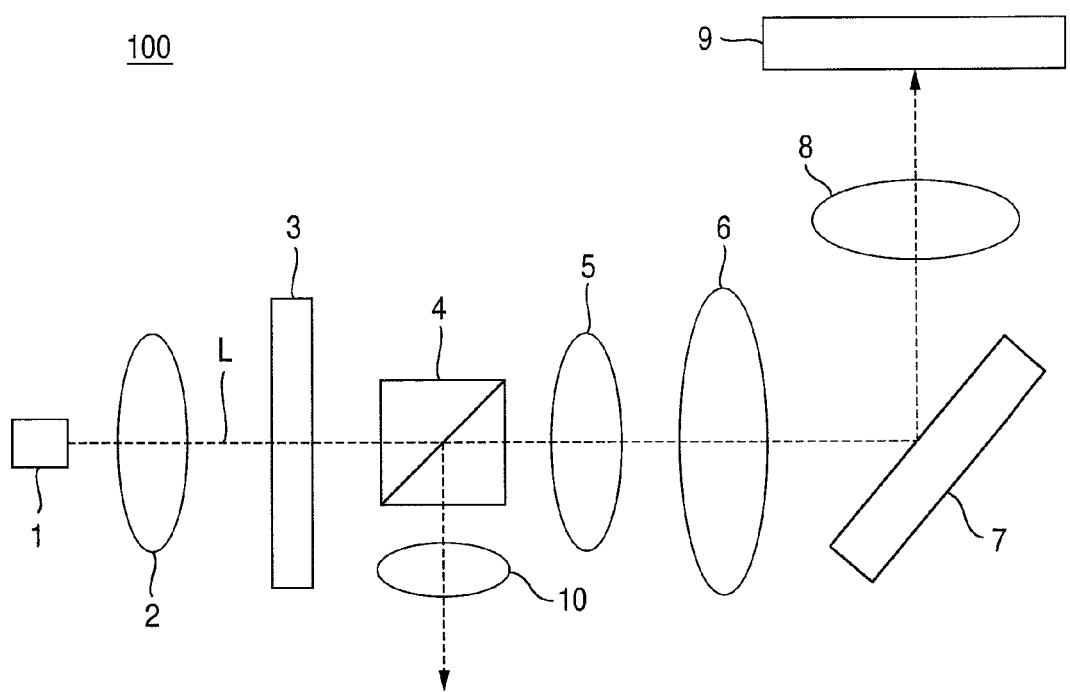
FIG. 3 is a schematic block diagram showing a layout of an optical element in an optical pickup unit in accordance with an embodiment of the present invention.

FIG. 3 shows a schematic block diagram of an optical system of an optical pickup unit 100 in accordance with the present invention. As shown in the drawing, a laser light L outgoing from a laser diode 1 goes into a collimator lens 2 so as to be changed to a parallel light, passes through a diffraction grating 3, and goes into a polarized beam splitter 4. Further, it passes through a movable lens 5, goes into a fixed lens 6, is changed in a direction thereof at 90 degree by a mirror 7, passes through an objective lens 8, and is focused on an optical disc 9. In FIG. 3, a detection lens 10 is a lens for conducting the laser light L branched from the polarized beam splitter 4 to a light detector (not shown). The optical pickup unit 100 is basically structured as mentioned above.

In order to increase a storage capacity, a first recording layer and a second recording layer are provided within the optical disc 9 in such a manner as to be overlapped in a thickness direction of the disc. In the case of accessing to the first recording layer and the second recording layer of this kind of optical disc 9, a thickness of a cover glass (a substrate) is changed, and a spherical aberration is generated. Accordingly, in order to correct them, it is necessary to adjust the light going into the objective lens 8 by changing to a weak divergent light or a weak convergent light. In the present embodiment, the structure is made such that the spherical aberration is corrected by moving and adjusting the movable lens 5 in a direction of an optical axis by a lens feeding device mentioned below.

For example, in the Blu-ray-Disc, since an interval between the first recording layer and the second recording layer in the optical disc 9 is about 25 μm, the spherical aberration of 250 mλ is generated.

In the present embodiment, there is employed a lens which can correct the spherical aberration of 10 mλ in the case of moving the movable lens 5 at 20 μm by using the lens feeding device (a spherical aberration correcting device) mentioned below. Further, in order to accurately correct the spherical aberration, it is necessary to make a feeding amount of the movable lens 5 small.

Further, in the Blu-ray-Disc, a track pitch is 0.32 μm which is very small. Accordingly, in the case that a fluctuation of an irradiation position of the laser light in a tracking direction (a disc radial direction) is not controlled within a range equal to or less than 0.32/4=0.08 μm, it is hard to execute the tracking.

Further, if the movable lens 5 is slightly fluctuated in the surface direction at a time of moving the movable lens 5 for correcting the aberration, a tracking misalignment is generated. Although depending on an optical magnification of the used movable lens 5, for example, in the case that the optical magnification is about eightfold, a value 0.08 μm×8≈0.6 μm is obtained, and it is necessary to make the fluctuation in a surface direction of the movable lens 5 smaller than 0.6 μm. In the case that a fluctuation speed in the surface direction of the movable lens 5 is low, the objective lens 8 can track. Accordingly, it is possible to correspond to the fluctuation, for example, about 3 μm. However, in the case that the fluctuation speed is high, for example, equal to or more than 4 kHz, the objective lens 8 can not track. Accordingly, it is necessary to structure such that the movable lens 5 is not fluctuated at a high speed.

Figure 1:
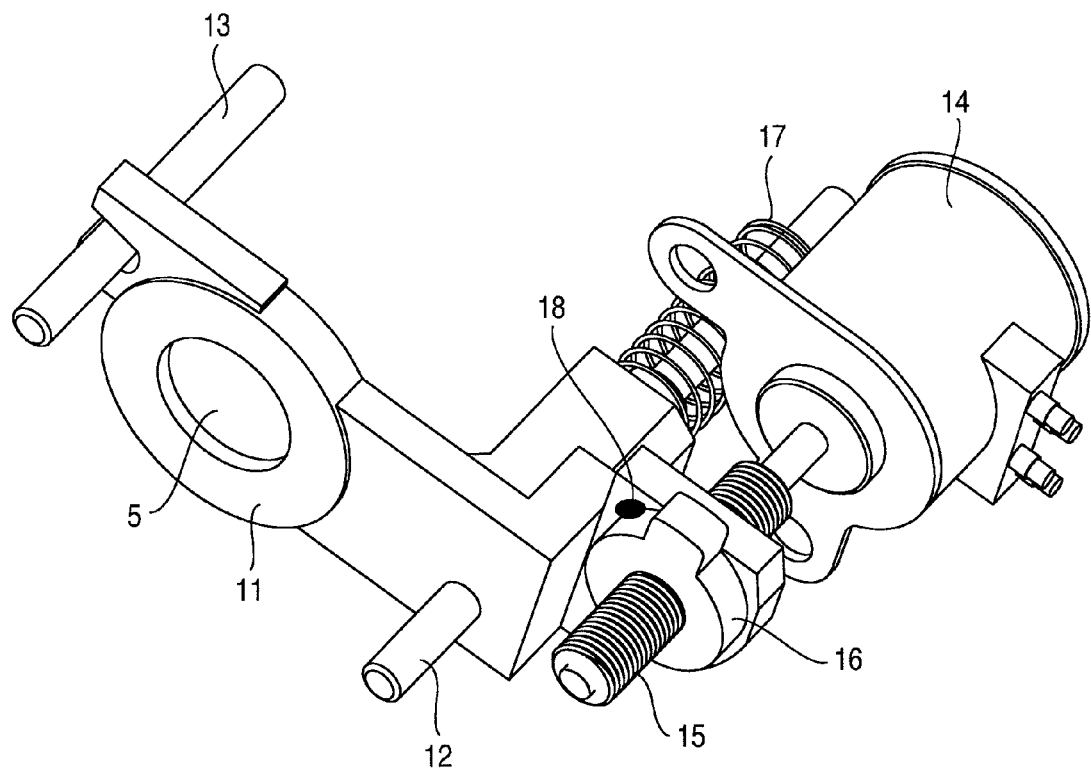
FIG. 1 is a view for explaining a structure of a lens feeding device in accordance with an embodiment of the present invention.

FIG. 1 shows a structure of a lens feeding device for moving and adjusting the movable lens 5. The lens feeding apparatus is provided with a movable frame (a movable member) 11 to which the movable lens 5 is attached, a main shaft 12 and a sub shaft 13 for holding the movable frame 11 in such a manner as to be movable in the direction of the optical axis of the movable lens 5, and a stepping motor 14 having a rotating shaft.

The movable frame 11 to which the movable lens 5 is attached is reciprocated in the direction of the optical axis on the basis of a guide of the main shaft 12 and the sub shaft 13 arranged in parallel to the direction of the optical axis of the laser light L shown in FIG. 3.

A lead screw 15 is coaxially attached to the rotating shaft of the stepping motor 14. The rotating shaft of the stepping motor 14 is arranged in parallel to the optical axis of the movable lens 5, and the lead screw 15 is also in parallel to the optical axis of the movable lens 5. The lead screw 15 is arranged in parallel to both of the main shaft 12 and the sub shaft 13. The lead screw 15 is rotated by the rotation of the rotating shaft of the stepping motor 14.

In this case, the structure is made such that the lead screw 15 is coaxially provided with the rotating shaft of the stepping motor 14, and the rotation of the rotating shaft of the stepping motor 14 is directly transmitted to the lead screw 15, however, the present invention is not limited to this, but the lead screw 15 may not be coaxially provided with the rotating shaft of the stepping motor 14, as far as the lead screw 15 is arranged in parallel to the optical axis of the movable lens 5, for example, the structure may be made such that the rotation of the rotating shaft of the stepping motor 14 is transmitted to the lead screw 15 via a gear.

Figure 2:
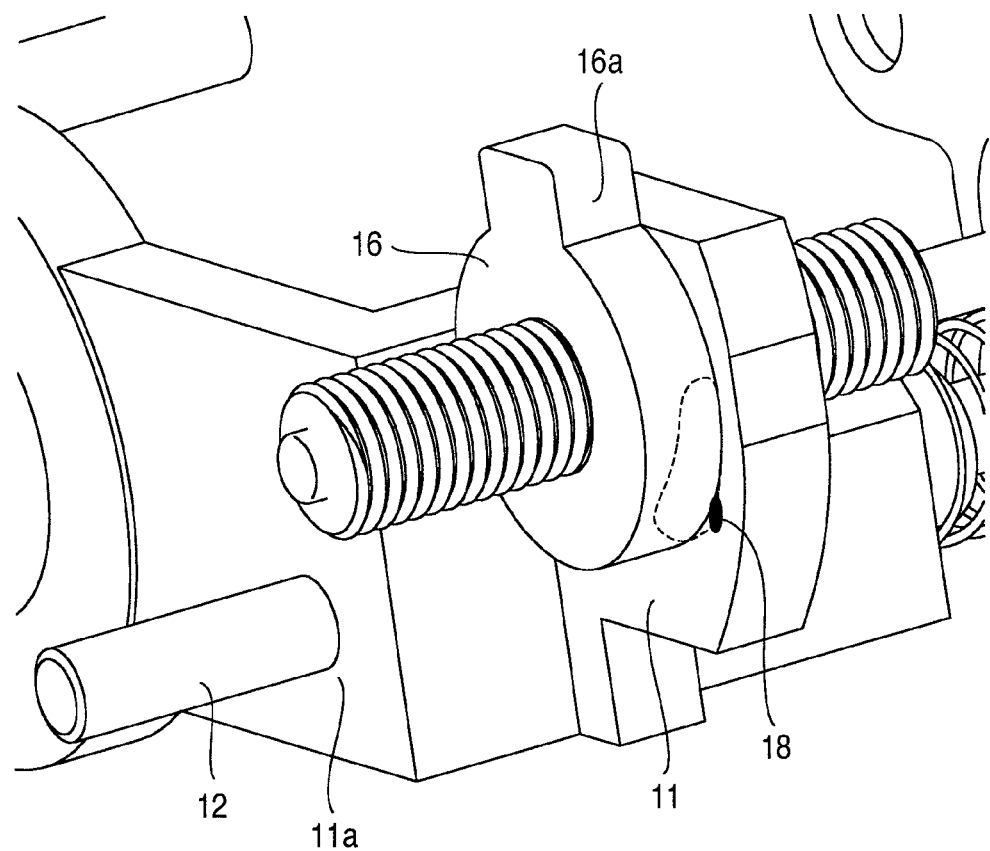
FIG. 2 is an enlarged explanatory view of the lens feeding device in FIG. 1.

A nut 16 integrally provided with a rotation preventing portion 16a shown in FIG. 2 is engaged with the lead screw 15. The nut 16 is moved in an axial direction of the lead screw 15 depending on the rotation of the lead screw 15. In the present embodiment, the nut 16 is formed of a resin. As mentioned above, since the resin nut 16 is used, it is possible to stably move the nut even if an amount of grease applied between the lead screw 15 and the nut 16 for increasing a lubricating ability is made less than the case that the metal nut is used. In the case that an application amount of the grease is much, a viscosity of the grease is changed in correspondence to a ambient temperature change. Accordingly, there is a case that a rotational load of the rotating shaft of the stepping motor 14 is fluctuated. However, since the present invention can reduce the application amount of the grease by using the resin nut, it is possible to suppress the fluctuation of the rotational load mentioned above. Therefore, there is not generated the problem that the minimum driving voltage becomes higher, and the margin such as the step out or the like runs short. As a result, it is possible to intend to reduce the electric power consumption of the stepping motor 14. Further, since the nut 16 is manufactured of the resin in the present invention, it is possible to obtain an excellent mass production performance and reduce a cost.

Three through holes are formed in the movable frame 11, and the main shaft 12, the sub shaft 13 and the lead screw 15 are loosely fitted to the respective through holes. The movable lens 5 is attached to a portion between the through hole through which the main shaft 12 passes, and the through hole through which the sub shaft 13 passes. The movable frame 11 is supported by the main shaft 12 and the sub shaft 13 in such a manner as to be movable in the direction of the optical axis of the movable lens 5.

The movable frame 11 is bent between a portion where two through holes through which the main shaft 12 and the sub shaft 13 pass are formed, and a portion where a through hole through which the lead screw 15 passes is formed, as shown in FIG. 1, and has a structure in which both of the portions are arranged in parallel to each other. However, in the present invention, the structure of the movable frame 11 is not limited to the structure shown in FIG. 1, but may be constituted by a flat plate-shaped member with no bent portion, which is structured such that a forming surface of two through holes through which the main shaft and the sub shaft pass, and a forming surface of the through hole through which the lead screw 15 passes, form the same surface.

On the stepping motor side of the nut 16 engaged with the lead screw 15, the movable frame 11 is loosely fitted on the lead screw 15. A coil-shaped pressure applying spring 17 is loosely fitted on the main shaft 12, one end portion of the pressure applying spring 17 is brought into contact with the movable frame 11, and the other end portion is fixed to a fixing portion (not shown). The pressure applying spring 17 elastically presses the movable frame 11 in a direction of an optical axis of the fixed lens. Accordingly, the portion in the movable frame 11 loosely fitted on the lead screw is elastically pressed toward the nut 16, and a part of the movable frame 11 is brought into contact with a side surface of the nut 16. Therefore, the movable frame 11, and the movable lens 5 attached to the movable frame 11 are moved together with the nut 16 in accordance with the rotation of the stepping motor 14 (the lead screw 15).

FIG. 2 is a schematic view showing a portion around the nut 16 of the lens feeding device 16 shown in FIG. 1 in an enlarged manner. A rotation preventing portion 16a is formed in the nut 16, and the rotation preventing portion 16a is movably inlet into a groove provided in a base (not shown). When the rotating shaft of the stepping motor 14 is rotated, and the lead screw 15 is rotated, the nut 16 is rotated in a range regulated by the rotation preventing portion 16a. Thereafter, the rotation preventing portion 16a comes into collision with the groove provided in the base so as to be going to repel. In other words, when the lead screw is rotated by driving the stepping motor 14, the nut 16 moves in the axial direction of the lead screw 15 while oscillating.

In the present embodiment, such the motion of the nut 16 is absorbed and suppressed by providing grease 18 serving as a cushioning material between the nut 16 and a portion of the movable frame 11 provided with a connecting hole for the lead screw. As a result, the nut 16 is not fluctuated at a high speed, and the movable frame 11 is moved stably in the direction of the optical axis.

In the case that the cushioning material 18 mentioned above is not provided, the nut 16 is oscillated at a time of rotating the lead screw 15. Further, the oscillation is transmitted to the movable frame 11, and the movable frame 11 is going to be fluctuated in a longitudinal direction (the direction of the optical axis). At this time, the movable frame 11 is fluctuated in the different direction from the direction of the optical axis of the movable lens 5, due to a clearance between the main shaft 12, and a guide hole 11a of the movable frame 11 to which the main shaft 12 is inserted. Further, since the fluctuation of the movable frame 11 is generated by the oscillation of the nut 16, the oscillation of the movable frame 11 comes to a high-frequency oscillation, and it is hard to execute a tracking control. In order to prevent the oscillation of the nut 16 from being transmitted to the movable frame 11, there can be considered that the nut 16 and the movable frame 11 are directly fixed. However, in this case, if the main shaft 12, the sub shaft 13 and the lead screw 15 are not arranged in parallel at a high precision, it is hard to move the movable frame.

Accordingly, in the present invention, since the oscillation of the nut 16 is absorbed and suppressed with the cushioning material by coupling the nut 16 to the movable frame 11 via the cushioning material so as to structure such that the nut 16 can move (float) with play with respect to the movable frame 11, it is possible to prevent the high-frequency fluctuation of the movable frame 11 as mentioned above, and it is possible to stably execute the tracking control.

In the present embodiment, it is preferable that the grease serving as the cushioning material has a high viscosity, and it is preferable that the grease has a plastic accommodating characteristic and maintains a high viscosity even if the surrounding temperature becomes high. As the grease mentioned above, there can be exemplified SANKOL LEN-315Y (trade name) manufactured by Sankei Kagaku Co., Ltd.

In this case, the grease is partly provided as the cushioning material between a portion of the movable frame 11 in which a connecting hole for the lead screw is formed (hereinafter, refer to a lead screw connection portion), facing to the side surface of the nut 16, and the side surface of the nut 16. However, the position provided with the grease and the region provided with the grease are not limited to this position or this region. The grease may be provided at whatever position the nut 16 and the movable frame 11 are connected via the grease. For example, the grease may be formed between a part of the outer periphery of the nut 16, and the movable portion 11. Further, the grease may be provided in such a manner that a whole of the nut 16 is connected to the lead screw connection portion via the grease without being limited to the structure in which a part of the side surface of the nut 16 is connected to a part of the lead screw connection portion of the movable frame 11 via the grease.

Further, in the case that the grease is used as the cushioning material 18 in FIG. 2, a concave portion or a convex portion may be provided in such a manner that a gap is formed between the nut 16 and the lead screw connection portion of the movable frame 11, thereby forming a grease reservoir. Accordingly, it is possible to stably hold the grease between the nut 16 and the lead screw connection portion of the movable frame 11 so as to obtain an effect that the grease does not run away due to an impact or the like, and it is possible to stably suppress the oscillation of the nut 16.

Figure 4A:
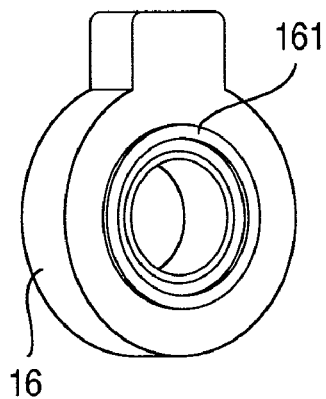
FIGS. 4A, 4B and 4C are explanatory views of a shape of a nut portion in accordance with an embodiment of the present invention.
Figure 4B:
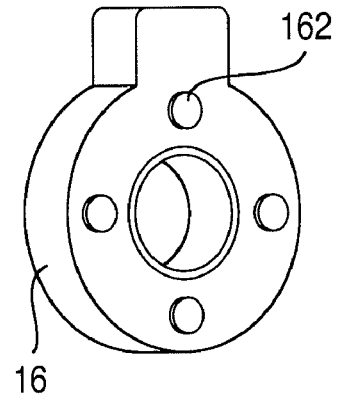
Figure 4C:
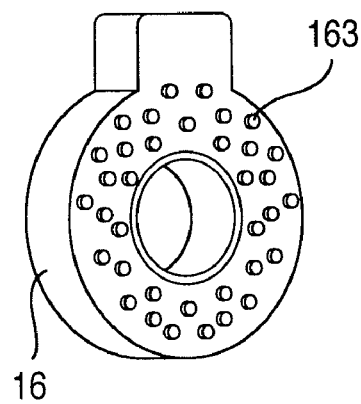

FIGS. 4A to 4C show a structure example in the case that the grease reservoir is provided in the nut 16, and show a structure in which the gap is provided between the movable frame 11 and the nut 16. FIG. 4A shows an example in which a ring-shaped convex portion 161 is formed in the side surface of the nut 16, and FIG. 4B shows an example in which four convex portions 162 are formed in the side surface of the nut 16. Further, FIG. 4C shows an example in which a lot of convex portions 163 are uniformly formed. It is possible to obtain the effect that the grease does not run away due to the impact or the like by employing any of these nuts 16. Further, in the example shown in FIG. 4A, it is possible to prevent the grease from going into the lead screw by setting the grease on the outer peripheral side of the ring-shaped convex portion.

Further, in this case, the convex portion is formed in the nut 16, however, the same effect can be obtained by setting the convex portion in the movable frame 11. Further, the same effect can be obtained by setting a concave portion in the nut 16 or the movable frame 11 in place of the convex portion.

Figure 5A:
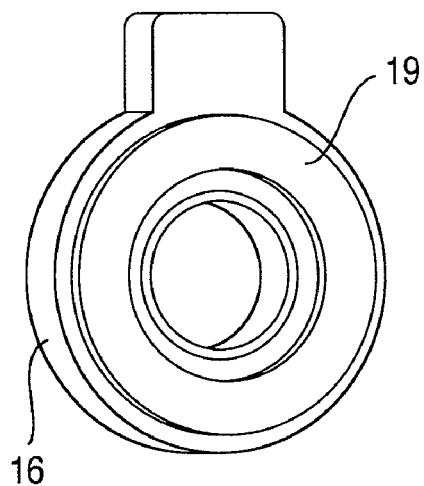
FIGS. 5A and 5B are explanatory views of a cushioning material provided in the nut portion in accordance with an embodiment of the present invention.

Further, in the embodiment mentioned above, there are shown the examples in which the grease is employed as the cushioning material, however, in the present invention, it is possible to employ a sponge, a rubber or the like as the cushioning material, in addition to the grease. FIG. 5A shows a structure example in which a sponge 19 is employed as the cushioning material 18, and the sponge 19 is attached to the side surface of the nut 16. Further, the sponge 19 may be formed in the movable frame 11. Further, FIG. 5B shows a structure example in which a rubber 20 is employed as the cushioning material.

Figure 5B:
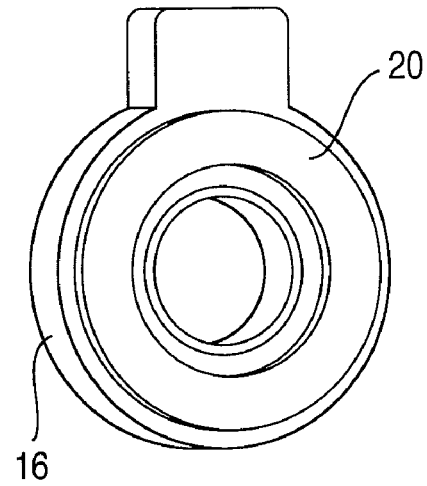

In the structure examples shown in FIGS. 5A and 5B, the sponge 19 and the rubber 20 may be arranged in a whole of a circumference of the side surface of the nut 16 or may be arranged partly. In either structure, it is possible to obtain the same effect as the effect mentioned above.

Figure 6:
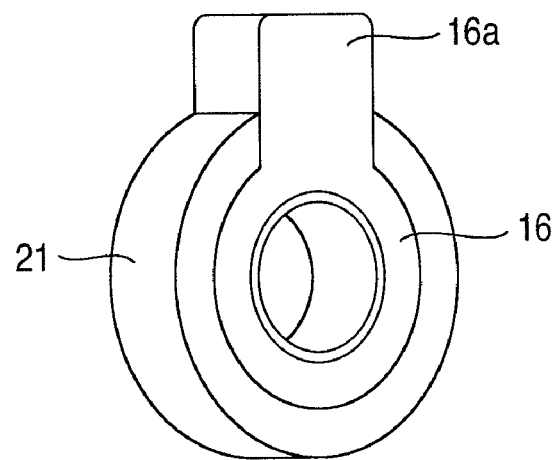
FIG. 6 is an explanatory view of a weight provided in the nut portion in accordance with the embodiment of the present invention.

In the example mentioned above, the nut 16 is formed by the resin, however, may be formed by a metal or the like for enlarging a weight of the nut. FIG. 6 shows a structure in which a metal 21 is arranged in an outer periphery of the nut 16 except the rotation preventing portion 16a. It is possible to reduce an unnecessary oscillation of the nut 16 by increasing the weight of the nut 16 as mentioned above. It is preferable that the metal is formed in the rotation preventing portion 16a. In other words, this is because if the metal is formed in the rotation preventing portion 16a, there is a risk that an impact force at a time of a collision with a groove of a base (not shown) regulating the rotation preventing portion 16a is increased. Further, it is preferable that the metal is formed except the contact portion with the lead screw 15. In other words, this is because if the contact portion with the lead screw 15 is formed by the metal, it is necessary to increase an amount of a lubricating agent for smoothening the rotation.

As described above, an optimum position is determined while driving in such a manner as to correct the spherical aberration every time when the disc 9 is changed, for correcting the thickness dispersion of the disc 9. At the time, it is possible to provide a stable device in which a tracking misalignment is not generated, and it is possible to make the pickup compact by making the spherical aberration correcting device compact, whereby it is possible to make the whole of the device compact.

Figure 7:
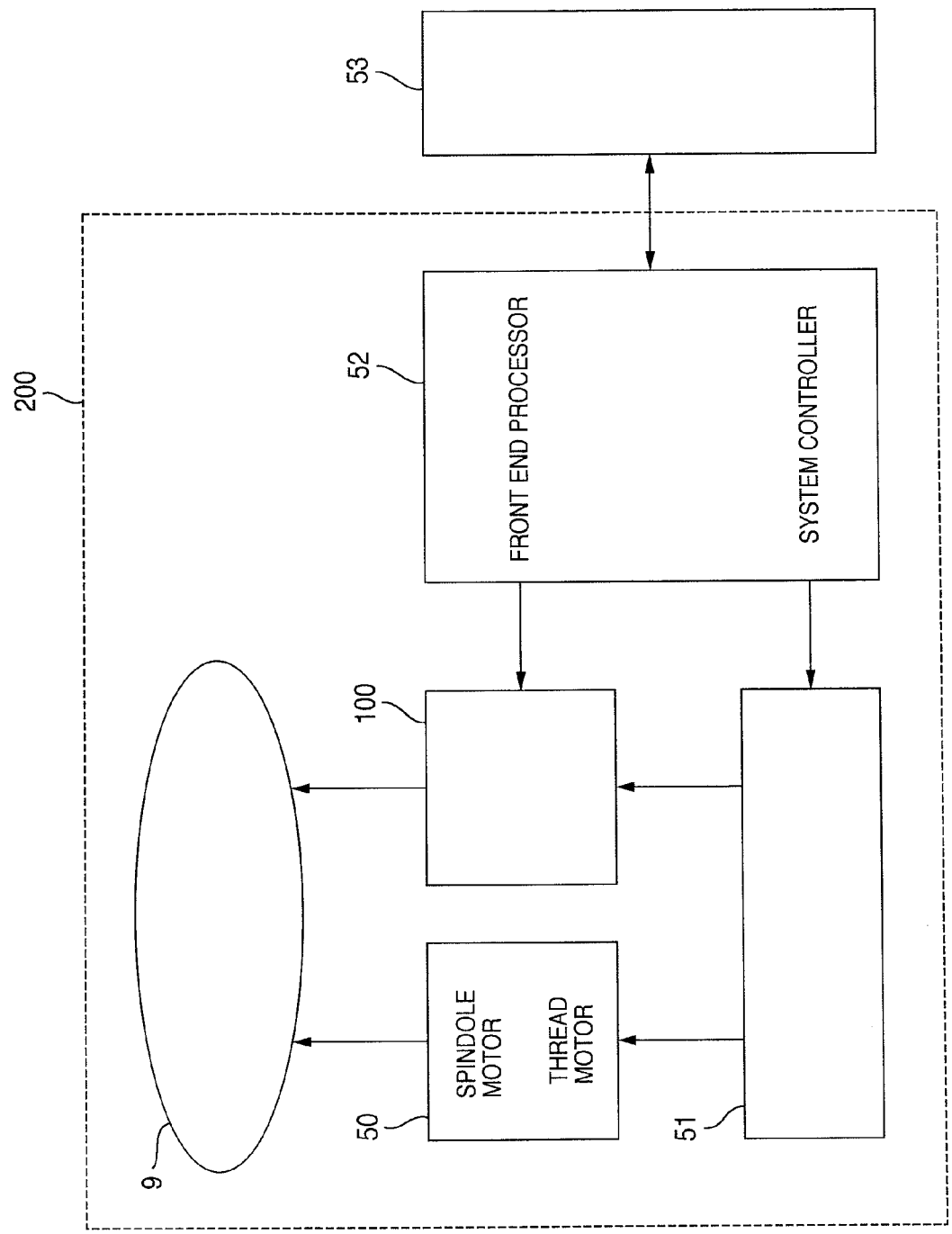
FIG. 7 is an explanatory block diagram of an optical disc device using the lens feeding device in accordance with the present invention.

FIG. 7 shows a block diagram of a whole of the optical disc device using the optical pickup employing the present device. An optical pickup device 200 is provided with an optical pickup 100 for recording and reproducing a signal on the disc 9, a driving portion 50 constituted by a spindle motor rotating the disc 9 and a thread motor moving the optical pickup in a radial direction, a driver 51 for supplying an electric power to the driving portion 50, and a circuit processing portion 52 constituted by a system controller for controlling the driver 51 and the optical pickup 100 and a front end processor processing a signal of the optical pickup 100. The circuit processing portion 52 is connected to a host PC 53 so as to be controlled.

The optical pickup has the lens feeding device (the spherical aberration correcting device) built-in, and the system controller of the circuit processing portion 52 outputs command and it is driven by the driver circuit.

The description is in detail given above of the optical element feeding device in accordance with the present invention and the optical pickup device using the same on the basis of the embodiments, however, the present invention is not limited to these embodiments, but may be variously modified and changed within the scope of the present invention.

The invention claimed is:

1. An optical element feeding device mounted on an optical pickup unit for moving an optical element in a direction of an optical axis for aberration correction, the optical element feeding device comprising: support means for supporting a movable member in which an optical element is arranged in such a manner as to be movable in the direction of the optical axis; a stepping motor having a rotating shaft to drive the movement of the movable member; a screw coaxially attached to the rotating shaft of the stepping motor, arranged in parallel to the optical axis of the optical element and rotated on the basis of a rotation of the rotating shaft of the stepping motor; a resin nut fitted on the lead screw, the resin nut being provided with a rotation preventing portion and being movable in an axial direction of the lead screw on the basis of the rotation of the lead screw; and a pressing member arranged to elastically press the movable member in the direction of the optical axis so as to bring the movable member into contact with the resin nut, wherein a part of an outer periphery of the resin nut is coupled to the movable member by an oscillation suppression material having a viscosity, sufficient to constantly suppress oscillation of the resin nut caused when the nut is moved by rotation of the lead screw to prevent fluctuation of the movable member, wherein said oscillation suppression material has a plastics accommodating characteristic and maintains sufficient viscosity during increased temperature to continue suppressing oscillation of the nut at said increased temperature.

2. The optical element feeding device as claimed in claim 1, wherein the lead screw is directly connected onto the rotating shaft of the stepping motor.

3. The optical element feeding device as claimed in claim 1, wherein the oscillation suppression material having the viscosity couples a part of the resin nut and a part of the movable member.

4. The optical element feeding device as claimed in claim 3, wherein a concave portion or a convex portion for keeping the oscillation suppression material having the viscosity is formed in at least one of the movable member and the resin nut to keep the oscillation suppression material stably in contact with the nut.

5. The optical element feeding device as claimed in claim 1, wherein a metal is formed around the resin nut, except said rotation preventing portion.

6. An optical pickup unit comprising:
an optical element feeding device as claimed in claim 1;
a laser light source;

a collimator lens for changing a laser beam radiated from said laser light source to a parallel light;

a collecting lens for collecting said laser beam on an optical disc; and a light detector for detecting a return light from said optical disc.

7. An optical lens feeding device mounted on an optical pickup unit, for adjusting a position of a movable lens arranged between a light source and a fixed lens in the optical pickup unit in a direction of an optical axis to correct a spherical aberration, the optical lens feeding device comprising: a movable frame arranged to support a movable lens; a main shaft and a sub shaft arranged in parallel to the direction of the optical axis of the movable lens, and mounted at opposite ends of the movable frame so as to enable the movable frame to move in the direction of the optical axis of the movable lens; a stepping motor arranged to drive the movement of the movable frame supporting the movable lens; a lead screw coaxially attached to a rotating shaft of the stepping motor, arranged in parallel to the direction of the optical axis of the movable lens and to both the main shaft and the sub shaft, and rotated on the basis of a rotation of the rotating shaft of the stepping motor; a nut integrally provided with a rotation preventing portion, fitted on the lead screw and movable in an axial direction of the lead screw on the basis of the rotation of the lead screw; and a pressing member arranged to elastically press the movable frame in the direction of an optical axis of the fixed lens so as to bring a part of the movable frame into contact with a side surface of the nut, wherein a part of an outer periphery of the nut is coupled to the movable frame, via an oscillation suppression material having a viscosity sufficient to constantly suppress oscillation of the nut caused when the nut is moved by rotation of the lead screw to prevent fluctuation of the movable frame, wherein said oscillation suppression material has a plastics accommodating characteristic and maintains sufficient viscosity during increased temperature to continue suppressing oscillation of the nut at said increased temperature.

8. The optical lens feeding device as claimed in claim 7, wherein the lead screw is directly connected onto a rotating shaft of the stepping motor.

9. The optical lens feeding device as claimed in claim 7, wherein the oscillation suppression material having the viscosity couples a part of the nut and a part of the movable frame.

10. The optical lens feeding device as claimed in claim 9, wherein a concave portion or a convex portion for keeping the oscillation suppression material having the viscosity is formed in at least one of the movable frame and the nut to keep the oscillation suppression material stably in contact with the nut.

11. The optical lens element feeding device as claimed in claim 7, wherein a metal is formed around the nut, except for the rotation preventing portion.

12. The optical lens element feeding device as claimed in claim 7, wherein the optical pickup unit further comprises:

a collimator lens for changing a laser beam radiated from the light source to a parallel light;

a collecting lens for collecting the laser beam on an optical recording medium; and a light detector for detecting a return light from the optical recording medium.

13. The optical element feeding device according to claim 1, wherein the oscillation suppression material is arranged between the nut and the movable member to stably remain in contact with the nut so as not to become separated from the nut.

14. The optical element feeding device according to claim 1, wherein said oscillation suppression material is comprised of a high viscosity grease having a viscosity sufficient to suppress oscillation of the nuts when the nut is moved by rotation of the lead screw.

15. The optical element feeding device according to claim 1, wherein said oscillation suppression material is comprised of one of a sponge material or a rubber material.

16. The optical lens feeding device according to claim 7, wherein the oscillation suppression material is arranged between the nut and the movable member to stably remain in contact with the nut so as not to become separated from the nut.

17. The optical lens feeding device according to claim 7, wherein said oscillation suppression material is comprised of a high viscosity grease having a viscosity sufficient to suppress oscillation of the nuts when the nut is moved by rotation of the lead screw.

18. The optical lens feeding device according to claim 7, wherein said oscillation suppression material is comprised of one of a sponge material or a rubber material.

* * * * *